United States Patent
Gerhart et al.

[11] Patent Number: 5,949,480
[45] Date of Patent: Sep. 7, 1999

[54] BROAD BAND IMAGING SPECTRORADIOMETER

[75] Inventors: Grant R. Gerhart, Bloomfield Hills; Roy M. Matchko, Detroit, both of Mich.

[73] Assignee: The United States of America as represented by the Secretary of the Army, Washington, D.C.

[21] Appl. No.: 08/806,129

[22] Filed: Mar. 3, 1997

[51] Int. Cl.$^6$ ................................................. H04N 5/76
[52] U.S. Cl. ........................ 348/135; 356/345; 356/368
[58] Field of Search .......................... 348/135; 356/106, 356/364, 365, 366, 367, 368, 369, 370, 345, 346, 351; 250/225, 342, 330; 351/221

[56] References Cited

U.S. PATENT DOCUMENTS

| | | | |
|---|---|---|---|
| 3,410,624 | 11/1968 | Schmidt | 350/382 |
| 3,873,207 | 3/1975 | Bryngdahl | 356/106 |
| 4,042,302 | 8/1977 | Wentz | 356/74 |
| 4,523,847 | 6/1985 | Bjorklund et al. | 356/349 |
| 5,209,231 | 5/1993 | Cote et al. | 128/633 |
| 5,521,705 | 5/1996 | Oldenbourg et al. | 356/368 |
| 5,587,793 | 12/1996 | Nakai et al. | 356/367 |
| 5,788,632 | 8/1998 | Pezzaniti et al. | 600/316 |

FOREIGN PATENT DOCUMENTS

| | | | |
|---|---|---|---|
| 1262437 | 10/1986 | Russian Federation | 356/367 |
| 866091 | 4/1961 | United Kingdom | 356/367 |

OTHER PUBLICATIONS

Randall Thompson, Edward Fry, Jerold Bottiger; Polarization–Dependent Light Scattering Measurments Using an Electro–Optical Modulator Based Instrument; SPIE vol. 112 Optical Polarimetry; pp. 152–157, Aug. 1977.

*Primary Examiner*—Tommy P. Chin
*Assistant Examiner*—La Veria Baker
*Attorney, Agent, or Firm*—Peter A. Taucher; David L. Kuhn

[57] ABSTRACT

A method for obtaining spectral radiation data for points in a field of view utilizes a broad band variable filter to produce different intensity distributions on a photocell array. The array is in the focal plane of a camera and photocell locations correspond to points in the field of view. The variable filter has a sequence of optical train elements comprised of a first linear polarizer, a body of optically active material, a retarder and a second linear polarizer. A series of radiance measurements are taken at each photocell of the array and at least one of the optical train components is repositioned between measurements. For each photocell, a collection of photocell values is stored in a computer memory and is converted to a system of linear equations. Intensities for spectral components of light incident thereon are derived for each photocell. The method can be used to create a two-dimensional intensity map for the pixel array for each wavelength measured. Also, the method can be used to create a broad band spectroradiometer for points in the field of view.

9 Claims, 4 Drawing Sheets

BROAD BAND IMAGING SPECTRORADIOMETER

GOVERNMENT USE

The invention described here may be made, used and licensed by or for the U.S. Government for governmental purposes without paying us royalty.

BACKGROUND

Our method generally relates to the art of spectroradiometer construction, wherein a light beam is analyzed to determine its component wavelengths and their intensities. Our method performs a simultaneous analysis on a multiplicity of light beams entering a camera through a field of view. Our method yields a planar image representing a distribution of intensities for each wavelength of light passing through the field of view.

SUMMARY OF THE INVENTION

We have developed a method to analyze an object or scene in the field of view of a camera. By our method, spectrally separable radiation data characteristic of the object or scene are collected in a focal plane of the camera. Polychromatic light beams from the field of view are first passed through a linear polarizer so that that light waves of the beams vibrate in parallel planes. Then the light waves travel known distances through optically active material, individual light waves' rotation being a function of their wavelengths and distances travelled through the material. Next, the waves are transmitted through a retarder and are phase retarded uniquely according to their wavelengths. The light waves are again linearly polarized before they strike pixel locations in the camera's focal plane. The radiance at each pixel location is measured and stored n times, where there are n wavelengths in the light beam. One of the polarizers or the retarder or the optically active material or a combination of these is repositioned between measurements. The radiances are then used to derive intensities of the wavelengths at each pixel location.

DETAILED DESCRIPTION

Figure 1:
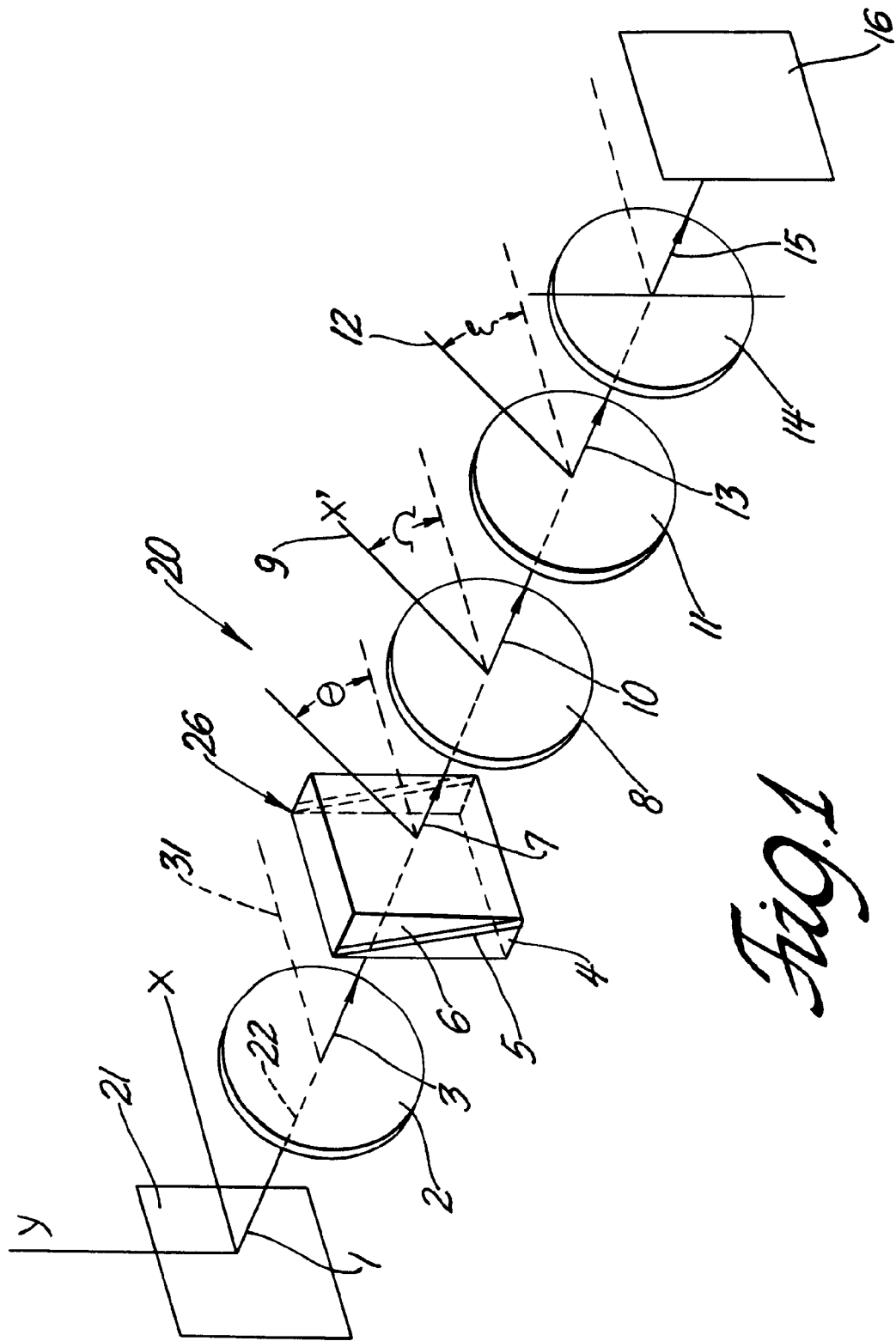
FIG. 1 is a diagram of light rays travelling from an object through an optical system operating according to our method.
Figure 2:
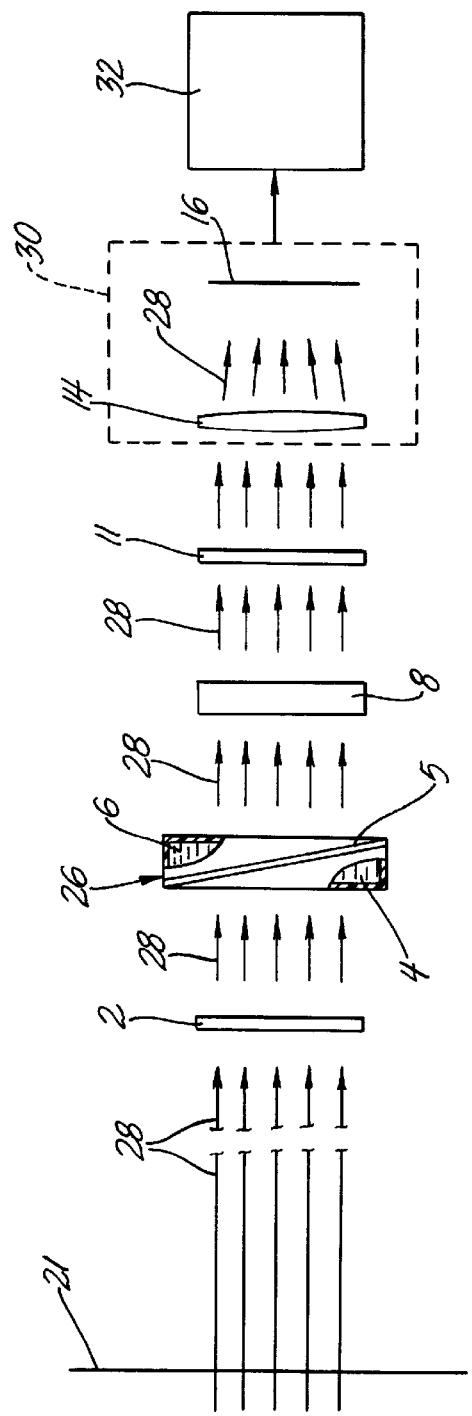
FIG. 2 is a diagram showing the passage of a single beam of light through the optical system.
Figure 3:
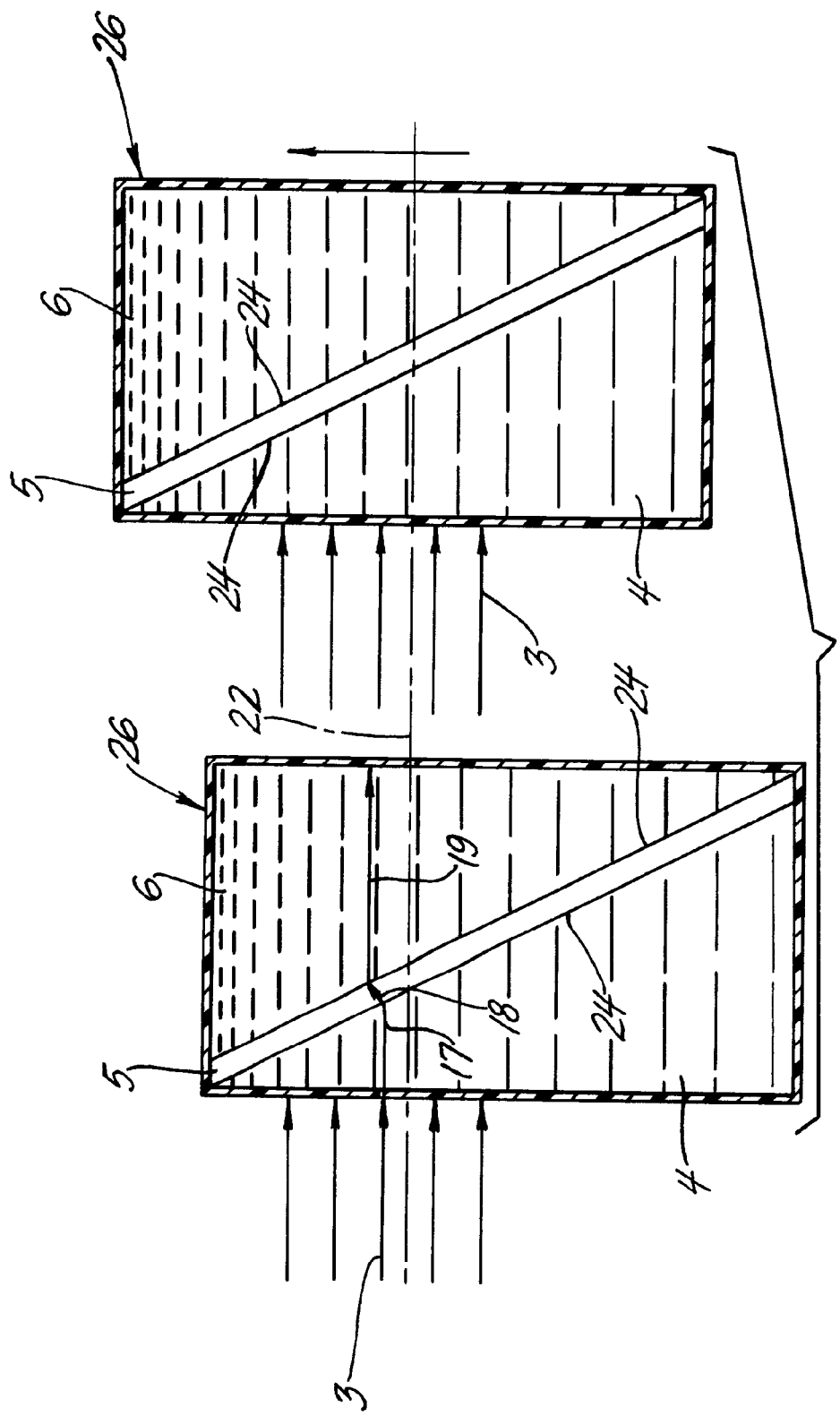
FIG. 3 shows two positions of a translatable optical element relative to a z-axis along which the optical system of FIG. 2 lies.

FIG. 1 shows the elements of one acceptable design for a system 20, which obtains spectrally separable radiation data representative of a scene or object viewed through a field of view 21. System 20 is also depicted in FIG. 2, along with an object 27 that is targeted for imaging by the system. In FIG. 2, light rays 28 from object 27 pass through field of view 21, then pass sequentially through a filter comprised of linear polarizer 2, a translatable optical element 26, a retarder 8 and another linear polarizer 11. Rays 28 then enter a digital camera through its focussing lens 14 and then strike a pixel array 16 in the focal plane of the camera. Pixel locations in array 16 correspond to matching points in the field of view 21, so that images formed in the focal plane are representative of what the camera sees in the field of view. The camera is represented at 30 by dashed lines and typically is a CCD camera.

FIG. 1 illustrates how each individual light wave is processed by system 20. A polychromatic light beam 1 from any point in field 21 is deemed to travel along z-axis 22 of a Cartesian coordinate system. Beam 1 passes through linear polarizer 2 having transmission axis 31 lying parallel to the x-axis. The resulting, exiting beam is referred to as transmitted light beam 3. Beam 3 has, for each wavelength thereof, the following x and y electrical field (E) components:

$$E_x^{(1)} = A(\lambda) \quad E_y^{(1)} = 0 \tag{1}$$

Beam 3 is transmitted through optical element 26, which is translatable to a finely controlled degree in the y direction, normal to the direction of light beam 3. Beam 3 first passes through a wedge shaped body of optically active material 4 in element 26. The planes of vibration of the beam's individual light waves rotate an angle θ. This angle differs, depending on the wavelengths of the individual waves and their path length through material 4. By translating element 26, the path length through material 4, and thus the filtering action of system 20, is infinitely variable. For optically active liquids:

$$\theta(l,\lambda,T) = l\alpha(\lambda,T) \tag{2}$$

where l is the path length through the liquid and α(λ,T) is the specific rotation (a function of wavelength λ and the temperature T) for a given concentration of optically active material in a solvent. In our method, we used the optically active material santonin ($C_{15}H_{18}O_3$) dissolved in ethyl alcohol at a concentration of 4.05 grams/100 ml at a temperature of 20° C. Other optically active materials can be used, but we deem santonin as most preferrable.

Once beam 3 passes through material 4, it passes through a transparent partition 5 with parallel sides oblique to the direction of the beam. The beam then passes through substance 6, which has the same absolute index of refraction as material 4 but is not optically active. Once beam 3 passes through element 26, it is referred to as transmitted beam 7 (FIG. 1).

Figure 4:
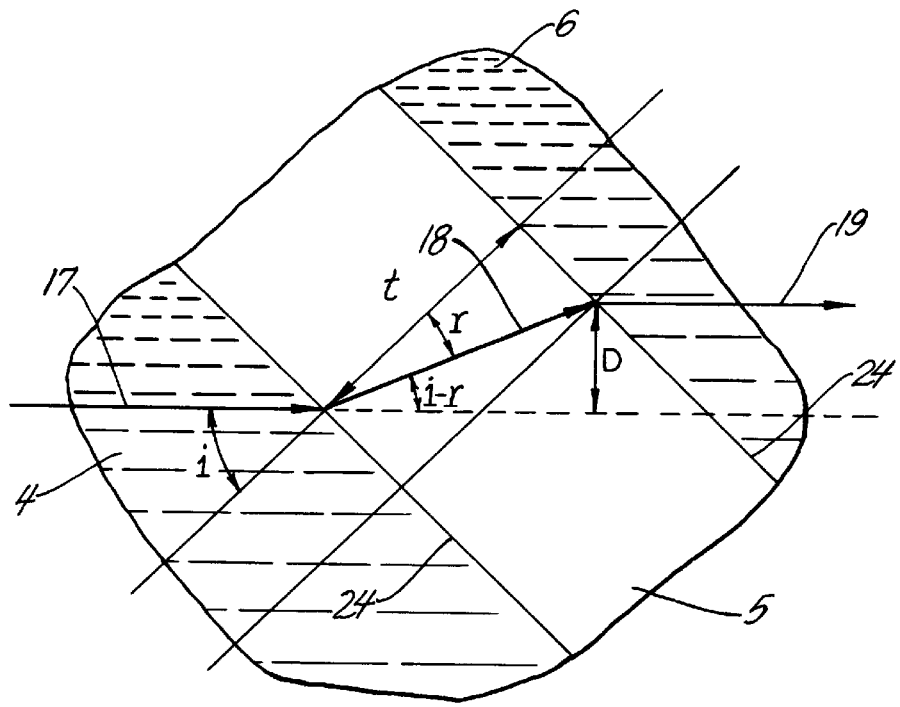
FIG. 4 is a diagram showing optical effects associated with the translatable optical element.
Figure 5:
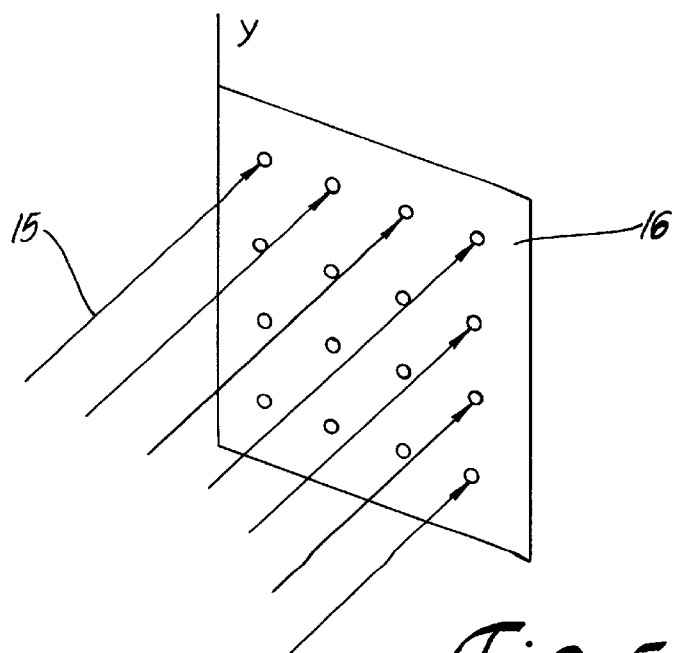
FIG. 5 is a graphic representation of a pixel array in the focal plane of a camera.

The effect of the passage of beam 3 through partition 5 is exemplified by noting how a given beam 17 in FIG. 4 refracts in partition 5 to become beam 19. Since sides 24 of partition 5 are parallel and since the absolute indices of refraction of material 4 and substance 6 are equal, beam 19 emerging from partition 5 is parallel to beam 17 incident on the partition. Emerging beam 19 will be displaced a distance D from incident beam 17, as given by $$D = \frac{t\sin(i-r)}{\cos r} \quad \text{where} \quad \sin r = \frac{n_4 \sin i}{n_5} \tag{3}$$

where $n_4$ and $n_5$ are the absolute indices of refraction for material 4 and substance 5, respectively. D's effect on images received at array 16 can be offset by optical elements or can be negated by standard image processing methods once a frame grabber 32 (FIG. 2) captures data from array 16.

Returning to FIG. 1, transmitted beam 7, which exits from substance 6, has x and y components given by $$E_x^{(2)}=A(\lambda)\cos\theta \quad E_y^{(2)}=A(\lambda)\sin\theta \qquad (4)$$

Let the components of Equation (4) be referred to a rotated rectangular coordinate system with axes x' and y'. The components in the new coordinate system are $$E_x^{(3)}=A(\lambda)\cos(\theta-\Omega) \quad E_y^{(3)}=A(\lambda)\sin(\theta-\Omega) \qquad (5)$$

where A is amplitude and $\Omega$ is the angle between the x-axis and the x'-axis as shown in FIG. 1. The Equation (5) wave components pass through a retarder 8 having retardation $\epsilon(\lambda)$, with the retarder's fast axis 9 parallel to the x' axis. The resulting new components, which comprise light beam 10 exiting retarder 8 in FIG. 1, are $$E_x^{(4)}=A(\lambda)\cos(\theta-\Omega) \quad E_y^{(4)}=A(\lambda)e^{i\epsilon}\sin(\theta-\Omega) \qquad (6)$$

The components of light in Equation 6, as referred to the original x and y axes, are $$E_x^{(5)}=A(\lambda)[\cos\Omega\cos(\theta-\Omega)-e^{i\epsilon}\sin\Omega\sin(\theta-\Omega)]$$

$$E_y^{(5)}=A(\lambda)[\sin\Omega\cos(\theta-\Omega)+e^{i\epsilon}\cos\Omega\sin(\theta-\Omega)] \qquad (7)$$

Light beam 10, comprised of the components defined in Equation 7, is transmitted through linear polarizer 11 having a transmission axis 12 at an angle $\xi$ from the x axis. The resulting light beam 13, which exits from polarizer 11, is comprised of components of the electric vector in the $\xi$ direction and is given by $$E^{(6)}=A(\lambda)[\cos(\Omega-\xi)\cos(\theta-\Omega)-e^{i\epsilon}\sin(\Omega-\xi)\sin(\theta-\Omega)] \qquad (8)$$

Using * to denote a complex conjugate, the intensity $I(\theta,\Omega,\xi,\epsilon)$ of the light vibrations in beam 13 is $E^{(6)}E^{(6)*}$ so that $$I(\theta,\Omega,\xi,\epsilon)=A(\lambda)^2\left(\cos^2(\theta-\xi)-\sin2(\Omega-\xi)\sin2(\theta-\Omega)\sin^2\frac{\epsilon}{2}\right) \qquad (9)$$

Empirical results show that the specific rotation, $\alpha$, of santonin dissolved in ethyl alcohol at a concentration of 4.05 grams/100 ml at a temperature of 20° C. can be explicitly expressed as a function of the wavelength, $\lambda$:

$$\alpha=3.936\times10^{10}\lambda^{-3.157} \text{degree/cm} \qquad (10)$$

where $\lambda$ is in nanometers. Substituting Equation (2), into Equation 10, one obtains $$\theta=l[3.936\times10^{10}\lambda^{-3.157}]\text{degree/cm} \qquad (11)$$

where again $\lambda$ is in nanometers. Since the retardation e introduced by retarder 8 is a function of wavelength $\lambda$, it is necessary to calculate $\epsilon$ for each $\lambda$ in beam 7. The phase difference $\epsilon$ between the E (extraordinary) and O (ordinary) waves introduced by retarder 8 is given by $$\epsilon=\frac{2\pi d(\Delta n)}{\lambda} \qquad (12)$$

where d is the thickness of the retarder and $\Delta n$ is the difference, $n_E-n_O$, of the absolute indices of refraction of retarder 8. Empirical results show that the following relation exists between $\lambda/\Delta n$ and $\lambda$ for a quartz retarder:

$$\lambda/\Delta n=120.04\lambda-6107.0 \qquad (13)$$

where $\lambda$ is in nanometers. Substituting Equation (13) into Equation (12) yields $$\epsilon=\frac{2\pi d}{120.04\lambda-6107.0} \qquad (14)$$

Since $\epsilon=\pi/2$ for a quarter wave plate retarder tuned to a wavelength $\lambda_T$, and in view of Equation (14), the thickness d of the plate can be obtained from $$d=30.01\lambda_T-1526.8 \quad (\lambda_T \text{ in nanometers}) \qquad (15)$$

Alternately, by substituting Equation (15) into Equation (14), the retardation $\epsilon$ for any visible wavelength $\lambda$ can be expressed as $$\epsilon=\frac{\pi}{2}\left(\frac{\lambda_T-50.876}{\lambda-50.876}\right) \qquad (16)$$

As light beam 10 passes through linear polarizer 11, the intensity I of each wavelength attenuates according to Equation (9). The radiance R, or sum of wavelength intensities, of beam 13 exiting from polarizer 11 and striking pixels in array 16 can be written as $$R=\int_{\lambda_0}^{\lambda_n}I(\theta,\Omega,\xi,\epsilon,\lambda)d\lambda \qquad (17)$$

Using the trapezoidal method, the definite integral of Equation 17, which can be interpreted as an area, can be approximated by $$R=\left[\frac{1}{2}I(0)+I(1)+I(2)+\ldots I(n-1)+I(n)\right]\Delta\lambda \qquad (18)$$

where n is the number of equal subdivisions in the wavelength integral and $\Delta\lambda$ is the width of each interval. Each intensity measurement I(j) in Equation (18) is a function of $\theta,\Omega,\xi$ and $\epsilon$. However, if $\theta,\Omega,\xi$ and $\epsilon$ and the concentration c and temperature T of the optically active solution are constant, each I(j) will be a function of the path length l and the wavelength $\lambda$. If n radiance measurements are made for different known path lengths l, they can be expressed as $$R_1=\left[\frac{1}{2}f(l_1,\lambda_1)I_{\lambda1}+f(l_1,\lambda_2)I_{\lambda2}+\right. \qquad (19)$$

$$\left. f(l_1,\lambda_3)I_{\lambda3}+\ldots+\frac{1}{2}f(l_1,\lambda_n)I_{\lambda n}\right]\Delta\lambda$$

$$R_2=\left[\frac{1}{2}f(l_2,\lambda_1)I_{\lambda1}+f(l_2,\lambda_2)I_{\lambda2}+f(l_2,\lambda_3)I_{\lambda3}+\right.$$

$$\left. \ldots+\frac{1}{2}f(l_2,\lambda_n)I_{\lambda n}\right]\Delta\lambda$$

$$\ldots$$

$$R_n=\left[\frac{1}{2}f(n_n,\lambda_1)I_{\lambda1}+f(l_n,\lambda_2)I_{\lambda2}+\right.$$

$$\left. f(l_n,\lambda_3)I_{\lambda3}+\ldots+\frac{1}{2}f(l_n,\lambda_n)I_{\lambda n}\right]\Delta\lambda$$

where $$f(l_i,\lambda_j)=\left(\cos^2(\theta_{ij}-\xi)+\sin2(\Omega-\xi)\sin2(\theta_{ij}-\Omega)\sin^2\frac{\epsilon_j}{2}\right) \qquad (20)$$

and where $$\theta_{ij}=l_i(3.936\times10^{10}\lambda_j^{-3.157}\text{degree/cm}) \qquad (21)$$

(santonin dissolved in ethyl alcohol, c=4.05 grams/100 ml at 20° C., $\lambda$ in nanometers), and where $$\epsilon_j = \frac{2\pi \times 10^6}{120.04\,\lambda_j - 6107} \quad \text{(quartz, } d = 1 \text{ mm, } \lambda \text{ in nm)} \tag{22}$$

and where $I_{\lambda i}=A_{\lambda i}^2$. Angles $\Omega$ and $\xi$ are constants. Each of the n number of radiances for each pixel location in array 16 are detected by sensors at these locations and then stored in frame grabber 32.

In matrix notation, $$\begin{vmatrix} R_1 \\ R_2 \\ \vdots \\ R_5 \end{vmatrix} = \Delta\lambda \begin{vmatrix} \frac{1}{2}f(l_1,\lambda_1) & f(l_1,\lambda_2) & f(l_1,\lambda_3) & \cdots & \frac{1}{2}f(l_1,\lambda_n) \\ \frac{1}{2}f(l_2,\lambda_1) & f(l_2,\lambda_2) & f(l_2,\lambda_3) & \cdots & \frac{1}{2}f(l_2,\lambda_n) \\ & \vdots & & & \\ \frac{1}{2}f(l_n,\lambda_1) & f(l_n,\lambda_2) & f(l_n,\lambda_3) & \cdots & \frac{1}{2}f(l_n,\lambda_n) \end{vmatrix} \begin{vmatrix} I_{\lambda 1} \\ I_{\lambda 2} \\ \vdots \\ I_{\lambda 3} \end{vmatrix} \tag{23}$$

Using letters to represent the matrices, $$R = \Delta\lambda M\,I \tag{24}$$

where the column matrix R represents the radiance measurements, M is called the attenuation matrix and contains the elements $f(l_i,\lambda_j)$ and the column matrix I contains unknown intensities. Solving Equation (24) for I, $$I = M^{-1} R/\Delta\lambda \tag{25}$$

where $M^{-1}$ is the inverse matrix of M and $$M^{-1} = \frac{\text{adj } M}{\det M} \tag{26}$$

The unknown intensities I can be found only if M has an inverse, that is, if M is square and the determinant of M is not zero.

We wish it to be understood that we do not desire to be limited to the exact details of construction or method shown herein since obvious modifications will occur to those skilled in the relevant arts without departing from the spirit and scope of the following claims.

We claim:

1. A method to analyze an object or scene wherein spectrally separable radiation data characteristic of the object or scene are collected at points in a focal plane of a camera corresponding to points in a field of view of the camera, the method comprising:

aiming a camera so that the object or scene is in the field of view of the camera;

linearly polarizing incident polychromatic light beams from the field to orient light waves of the beams into parallel planes;

passing the light waves known distances through an optically active material, whereby individual light waves rotate by amounts characteristic of their wavelengths and their distances travelled through the material;

transmitting the light waves through a retarder, thereby inducing phase retardations in the individual waves characteristic of the wavelengths;

subjecting the light waves to a second linear polarization;

allowing the light waves to strike pixel locations in the focal plane;

measuring a radiance at the pixel locations;

storing values for the radiances;

repeating the steps of polarizing, passing, transmitting, subjecting, allowing, measuring and storing n number of times, n being the number of wavelengths in the polychromatic beams;

changing a position of one of a set of filter elements between the repetitions, wherein the filter elements include means for linearly polarizing the incident light beam, the optically active material, the retarder, and means to effect the second linear polarization;

after n repetitions, using the radiances to derive intensities of n of the wavelengths at the pixel locations.

2. The method of claim 1 wherein:

the beams and waves are in an orthogonal coordinate system having an x-axis, a y-axis and a z-axis all perpendicular to one another, and the beams and waves travel in the z direction, and the field of view is perpendicular to the z-axis;

a surface of the optically active material faces toward the field of view and the thickness of the material varies in the y direction so that the distances travelled by the light wave through the material are a function of a y-coordinate of the light wave.

3. The method of claim 2 wherein the optically active material is translated in the y direction between repetitions.

4. The method of claim 1 where deriving the intensity of n of the wavelengths at the pixel locations uses the formula $$R_1 = \left[\frac{1}{2}f(l_1,\lambda_1)I_{\lambda 1} + f(l_1,\lambda_2)I_{\lambda 2} + \right. \tag{27}$$
$$\left. f(l_1,\lambda_3)I_{\lambda 3} + \ldots + \frac{1}{2}f(l_1,\lambda_n)I_{\lambda n}\right]\Delta\lambda$$

$$R_2 = \left[\frac{1}{2}f(l_2,\lambda_1)I_{\lambda 1} + f(l_2,\lambda_2)I_{\lambda 2} + f(l_2,\lambda_3)I_{\lambda 3} + \right.$$
$$\left. \ldots + \frac{1}{2}f(l_2,\lambda_n)I_{\lambda n}\right]\Delta\lambda$$

$$\ldots$$

$$R_n = \left[\frac{1}{2}f(n_n,\lambda_1)I_{\lambda 1} + f(l_n,\lambda_2)I_{\lambda 2} + \right.$$
$$\left. f(l_n,\lambda_3)I_{\lambda 3} + \ldots + \frac{1}{2}f(l_n,\lambda_n)I_{\lambda n}\right]\Delta\lambda$$

where $$f(l_i,\lambda_j) = \left(\cos^2(\theta_{ij} - \xi) + \sin2(\Omega - \xi)\sin2(\theta_{ij} - \Omega)\sin^2\frac{\epsilon_j}{2}\right) \tag{28}$$

and where $R_n$ is the nth radiance measurement, $l_n$ is the known length through the optically active material during the nth measurement for a given light wave, $\lambda$ is the wavelength of the nth light wave, $I_{\lambda n}$ is the intensity of the light wave of wavelength during the nth measurement, $\theta_{ij}$ is the rotation introduced by the optically active material for a given wavelength and distance therethrough, and $\Omega$ is the angle between the x-axis and a fast axis of the retarder.

5. The method of claim 2 wherein the optically active material is formed in a body tapering in the y direction, and the body is translated a measured amount in the y direction between repetitions.

6. The method of claim 5 wherein the body of the optically active material is the only optical element moved between the repetitions.

7. A method for collecting spectrally separable radiation data at points in a focal plane of a camera, comprising:

linearly polarizing light waves from a field of view of the camera, the field having a plurality of wavelengths;

passing the light waves known distances through optically active material, whereby individual light waves rotate by amounts characteristic of their wavelengths and the known distances;

transmitting the light waves through a retarder;

subjecting the light waves to a second linear polarization;

allowing the light waves to strike locations in the focal plane of the camera;

measuring a radiance at each location and storing values for the radiances;

repeating the steps of polarizing, passing, transmitting, subjecting, allowing, measuring and storing n times, n being the number of wavelengths measured in the waves;

moving one of a set of filter elements between the repetitions, wherein the filter elements include means for effecting a first instance of the polarizing step, the optically active material, the retarder, and means for effecting a second instance of the polarizing step;

after n repetitions, using the radiances to derive intensities of the wavelengths at the locations.

8. The method of claim 7 further comprised of using the intensities to create a graphic representation of a target in the field of view.

9. The method of claim 8 wherein the locations in the focal plain correspond uniquely to associated points in the field of view.

* * * * *